United States Patent [19]

Grimmer

[11] Patent Number: 4,563,132
[45] Date of Patent: * Jan. 7, 1986

[54] COMPOUND TURBOCHARGER SYSTEM FOR AN INTERNAL COMBUSTION ENGINE

[76] Inventor: John E. Grimmer, Franklin, Ind. 46131

[*] Notice: The portion of the term of this patent subsequent to Jan. 29, 2002 has been disclaimed.

[21] Appl. No.: 695,352

[22] Filed: Jan. 28, 1985

Related U.S. Application Data

[62] Division of Ser. No. 321,089, Nov. 13, 1981, Pat. No. 4,496,291.

[51] Int. Cl.$^4$ ............................................. F04B 17/00
[52] U.S. Cl. .................................... 417/247; 60/612; 417/364; 417/380
[58] Field of Search .................. 60/612; 417/246, 247, 417/248, 364, 380

[56] References Cited

U.S. PATENT DOCUMENTS

| | | | |
|---|---|---|---|
| 883,888 | 4/1908 | Keller | 417/247 |
| 2,628,015 | 2/1953 | Neugebauer et al. | 417/203 |
| 2,849,173 | 8/1958 | Surdy | 417/380 X |
| 3,204,859 | 9/1965 | Crooks . | |
| 3,250,068 | 5/1966 | Vulliamy . | |
| 3,462,074 | 8/1969 | Grimmer . | |
| 3,667,865 | 6/1972 | Faldi . | |
| 3,941,104 | 3/1976 | Egli . | |
| 4,232,997 | 11/1980 | Grimmer et al. . | |

FOREIGN PATENT DOCUMENTS

| | | | |
|---|---|---|---|
| 850965 | 9/1952 | Fed. Rep. of Germany . | |
| 2250390 | 5/1975 | France | 417/380 |
| 160008 | 4/1933 | Switzerland . | |
| 2034815 | 6/1980 | United Kingdom . | |
| 661127 | 5/1979 | U.S.S.R. . | |

Primary Examiner—Michael Koczo
Attorney, Agent, or Firm—Sixbey, Friedman & Leedom

[57] ABSTRACT

A compound turbocharger system for an engine/compressor unit is disclosed including a pair of conventional turbochargers including turbine components connected in series to convert exhaust gas energy from the engine cylinders into mechanical energy for driving a pair of impeller-type compressor components arranged to supply sufficient quantities of air to the intake manifold of the engine cylinders and to the intake manifold of the compressor cylinders. In one embodiment, the impeller-type compressor components are arranged in parallel. In a second embodiment, the impeller-type compressor components are arranged in series with the air supplied to the intake manifold of the engine cylinders being provided by the first compressor component. Smooth operation of the engine/compressor unit including substantial self-proportioning of the air boost to both the engine cylinders and compressor cylinders is assured by means of a compressor cylinder control means and engine throttle means for adjusting total compressed air output and engine rpm to the compressed air being utilized by enabling or disabling compressor cylinders one at a time in succession and by correspondingly adjusting the fuel flow to the engine cylinders. A compound turbocharger system is also disclosed for supplying compressed air to an air pressure operated conveyor.

5 Claims, 4 Drawing Figures

COMPOUND TURBOCHARGER SYSTEM FOR AN INTERNAL COMBUSTION ENGINE

This application is a division of application Ser. No. 321,089, filed Nov. 13, 1981, U.S. Pat. No. 4,496,291.

TECHNICAL FIELD

This invention relates to a compound turbocharger system for providing an air pressure boost for the intake manifold of an internal combustion engine while also providing an excess quantity of compressed air to satisfy the requirements of an auxiliary compressed air utilizing device.

BACKGROUND ART

For years, it has been recognized that the efficiency and power of an internal combustion engine, especially of the compression ignition type, could be substantially improved by boosting the intake manifold pressure. This is normally accomplished by means of a turbocharger including an impeller-type compressor powered by an exhaust driven turbine. When the internal combustion engine is used in conjunction with a compressed air utilizing device, such as an air compressor driven by the engine, it seems only logical to also use the compressor component of the turbocharger to provide a first stage boost for the engine driven air compressor thereby enabling significantly higher mass delivery and output air pressures for the same weight unit. One example of an exhaust driven turbocharger being used to provide intake manifold boost and first stage compression for an engine/compressor unit is illustrated in U.S. Pat. No. 3,204,850 to Crooks.

While turbocharged engine/compressor units of the type described above are excellent in concept, special problems arise when conventional turbochargers are selected to meet the peculiar demands of an engine/compressor unit. In particular, conventional turbocharger units are normally designed to receive exhaust gas from and supply air to the same engine cylinders. Thus, when the conventional turbocharger compressor is called upon to also supply air to an air compressor driven by the engine, the pressure boost and flow rate capacities of the compressor component of the turbocharger are normally inadequate. Simply selecting a larger conventional turbocharger does not solve the dilemma since the turbine component is then improperly sized for the available exhaust gases produced by the engine.

Despite the high costs involved, designers have considered specialized turbocharger units for use in engine/compressor units which employ a single multicylinder block and a single crankshaft for interconnecting both compressor pistons and engine pistons. Such units reduce the normally difficult problems associated with accommodating wide spacing between the engine and compressor cylinders. In an apparent attempt to capitalize on the inherent spacing advantage, U.S. Pat. No. 2,628,015 discloses a turbocharged single block engine/compressor in which the problem of improperly sizing the turbine and compressor components has been alleviated somewhat by directly coupling the turbocharger shaft to the crankshaft of the engine/compressor. While this approach may provide the additional drive to the turbocharger necessary to provide the desired quantity and pressure of compressed air, the added expense of providing a gear connection between the turbocharger and the engine/compressor unit reduces significantly the overall advantages associated with this design.

Numerous attempts have been made to achieve flexibility in turbocharger applications by arranging plural or compound turbocharger systems which may be altered in accordance with changes in the operating conditions of the engine unit to which the turbocharger system output is supplied. For example, the following patents disclose various compound turbocharger systems:

U.S. Pat. No. 3,250,068
U.S. Pat. No. 3,941,104
U.K. Patent Application No. 2,034,815A
Swiss Pat. No. 160,008
German Pat. No. 850,965
Russian Pat. No. 661,127

However, none of these compound turbocharger systems in any way addresses the problem of designing an exhaust driven turbocharger system using plural conventional exhaust driven turbocharger units to match the available requirements of an internal combustion engine while generating ample quantities of additional quantities of compressed gas.

DISCLOSURE OF THE INVENTION

A primary object of this invention is to provide a method and apparatus for generating a desired quantity of compressed air using only the available exhaust gas energy from an internal combustion engine by selecting and interconnecting two or more conventional exhaust driven turbochargers in a manner to most efficiently use the available exhaust gas energy for generating the compressed air desired.

An additional object of this invention is to overcome the deficiencies of the prior art as noted above by providing a method and apparatus for turbocharging an engine unit by interconnecting two or more conventionally available turbocharger units in a manner designed to satisfy the requirements of the engine unit while at the same time providing a substantial excess quantity of compressed air for auxiliary uses such as providing a first stage pressure boost to an air compressor driven by the engine.

Another more specific object of this invention is to provide a method for forming a turbocharged engine/compressor unit from a conventional multi-cylinder internal combustion engine having at least one cylinder converted for compressor operation including the steps of (1) selecting a pair of turobcharger units, (2) connecting the exhaust turbines fluidically in series to receive exhaust gases from the engine cylinders and (3) connecting the compressors fluidically in parallel for receiving air from the atmosphere and providing air under pressure in parallel to both the engine and compressor cylinders.

Still another object of this invention is to provide a turbocharger means for an engine driven air compressor having at least one engine cylinder and at least one compressor cylinder formed in a block which is the same as or separate from the block which contains the engine cylinder wherein the turbocharger means includes two or more impeller-type compressors fluidically connected to supply air under pressure to the engine cylinders and to the engine driven compressor and two or more turbines mechanically connected to the impeller-type compressors, respectively, and fluidically connected to receive exhaust gas from the engine cylinder and to convert exhaust energy to mechanical energy to drive the impeller-type compressors.

Yet another object of the subject invention is to provide a multi-cylinder engine/compressor unit to which air under pressure is supplied by first and second conventional turbochargers, each of which is aerodynamically and thermodynamically balanced to turbocharge a multicylinder internal combustion engine wherein each turbocharger includes a turbine and an impeller-type compressor driven by the turbines. The turbines are fluidically connected in series and the impeller-type compressors are connected in parallel in a manner to compress air received from the atmosphere and supply the compressed air in parallel to the engine cylinders and the compressed air cylinders of the combined engine/compressor unit.

Still another object of this invention is to provide a combined engine/compressor unit turbocharged by means of a compound turbocharger system combined with a compressor cylinder control means for enabling or disabling compressor cylinders one at a time in succession in response to a signal representative of the amount of compressed air being used by a device supplied with compressed air by the combined engine/compressor unit.

It is yet another object of this invention to provide a compressor cylinder control means as described above and an engine throttle means responsive to the compressor cylinder control means for controlling engine speed and torque by controlling the rate of which fuel is fed to the engine cylinders in response to changes in the amount of compressed air being utilized by the compressed air utilizing device.

Still other and more specific objects of this invention may be apparent from a consideration of the following Brief Description of the Drawings and the Best Mode for Carrying Out the Invention.

BEST MODE FOR CARRYING OUT THE INVENTION

Figure 1:
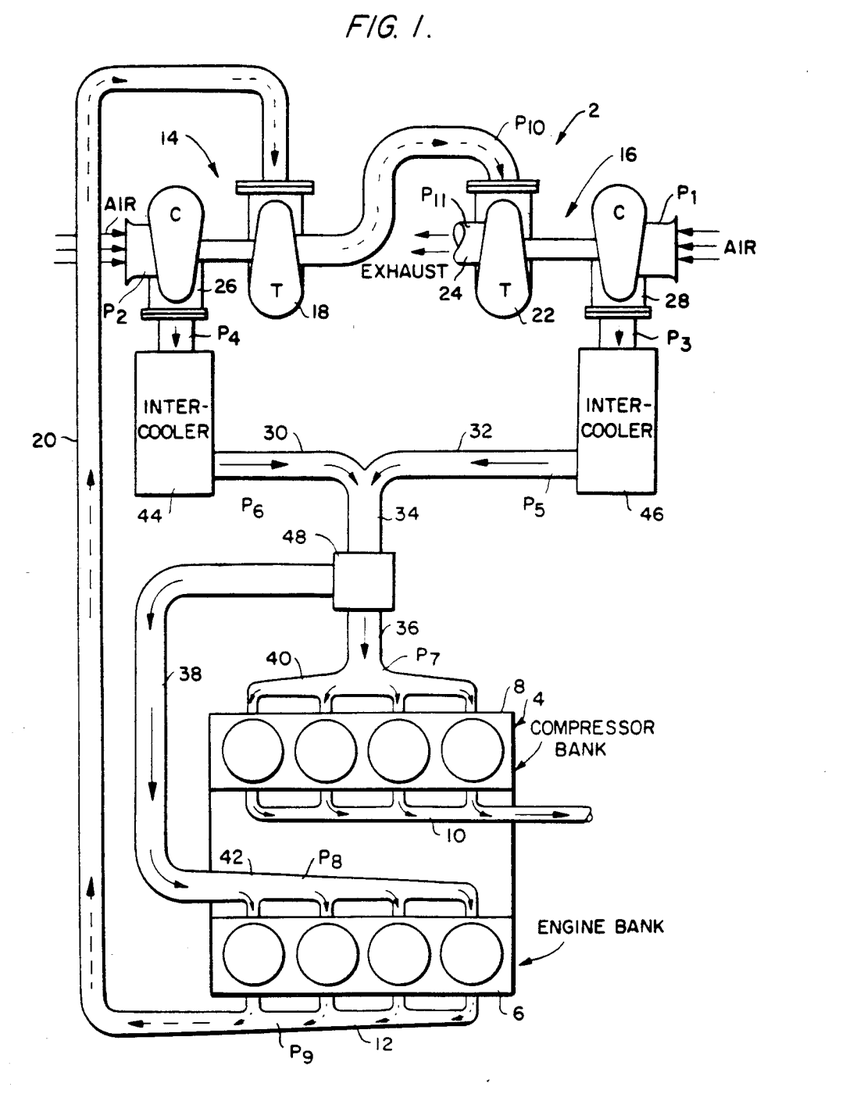
FIG. 1 is a diagrammatic illustration of an engine/compressor unit turbocharged by means of a compound turbocharger system designed in accordance with the subject invention.

For a more specific understanding of the subject invention, reference is made to FIG. 1 which discloses a compound turbocharger system 2 for supplying air under pressure to an engine/compressor unit 4. The engine/compressor unit may be of the type illustrated in commonly assigned U.S. Pat. No. 4,232,997 comprising a converted V-8 compression ignition engine such as manufactured by the Cummins Engine Company, Inc., Columbus, Ind. and identified by the designation V-903. In particular, one bank of cylinders 6 is left in its normal condition while the opposite bank of cylinders 8 is modified to cause each cylinder thereof to operate as an air compressor cylinder. More particularly, a new head for the compressor bank and valve operating arrangement is provided to cause each cylinder in the compressor bank 8 to be isolated from the engine fuel supply and to cause air to be supplied to each compressor cylinder during the corresponding piston downstroke and to cause air to be exhausted from the cylinder during the corresponding piston upstroke. The air discharged from the compressor bank cylinders is collected by an outlet manifold 10 and may be supplied to a storage tank, not illustrated, or to some other type of compressed air utilizing means, also not illustrated.

Because the cylinders within compressor bank 8 now require air during each downstroke, the turbocharger conventionally supplied with the unconverted compression ignition engine of FIG. 1 would be inadequate to supply the required quantity of compressed air. Moreover, exhaust gases are being generated only by the cylinders in bank 6 for supply to exhaust manifold 12. This reduction in available exhaust gases would further render the conventional turbocharger inadequate for the purpose of supplying sufficient turbocharger boost for both the engine cylinders 6 and the compressor bank cylinders 8 to produce the maximum possible increase in mass flow and output pressure to compressed air manifold 10 within the practical limits of the engine/compressor unit.

While a specially designed turbocharger unit might be constructed to accommodate the reduced exhaust gas and increased compressed air mass flow requirements, the cost of designing such a specialized turbocharger and the cost of manufacturing such an item in low volume would be prohibitively high. Such a turbocharger would require a much larger compressor wheel as compared with the turbine wheel thereby complicating the bearing and seal design. The subject invention solves this dilemma by employing two or more conventional turbochargers. In the specific embodiment illustrated in FIG. 1, two conventional turbochargers are noted including first turbocharger 14 and second turbocharger 16 each of which are aerodynamically and thermodynamically balanced to turbocharge a conventional multi-cylinder internal combustion engine by receiving exhaust gases from all of the engine cylinders and by supplying air under pressure in a quantity which is sufficient only to satisfy the requirements of the engine cylinders during normal engine operation. When the engine/compressor unit 4 is converted from a standard Cummins V-903 compression ignition engine, turbocharger 14 may be of the type manufactured by Roto Master under the designation T04 with a turbine A/R of 0.3 and a wheel trim of N and a compressor A/R of 0.6 and a wheel trim of V2. Turbocharger 16 may be of the type manufactured by Roto Master under the designation T04 with a turbine A/R of 0.69 and a wheel trim of P and a compressor A/R of 0.6 and a wheel trim of V2.

The turbocharger system 2 satisfies the requirements of the converted engine/compressor unit by uniquely interconnecting the first and second turbochargers 14 and 16 as illustrated in FIG. 1. In particular, the turbine component 18 of the first turbocharger 14 is connected to receive exhaust gases from manifold 12 directly through conduit 20. Turbine component 22 of the second turbocharger 16 is fluidically connected in series with turbine component 18 to receive the exhaust gases discharged from turbine component 18. Additional mechanical energy is derived from the exhaust gases by turbine component 22 before these gases are discharged from the turbocharger system through exhaust pipe 24. By this arrangement, the maximum possible amount of mechanical energy is generated from the limited supply of exhaust gases provided by the engine bank cylinders 6.

As further illustrated in FIG. 1, each turbocharger 14 and 16 includes a compressor component 26 and 28 mechanically connected to the corresponding turbine components 18 and 22, respectively. Both of these compressor components are arranged to receive air from the surrounding atmosphere and to supply this air in parallel through air supply branches 30 and 32 which combine to form air supply duct 34. The total available compressed air is passed on to the cylinders in both the compressor bank and the engine bank by means of air supply branches 36 and 38 connected to first intake manifold 40 and second intake manifold 42, respectively, arranged to supply compressed air to the compressor bank cylinders 8 and engine bank cylinders 6.

A pair of intercoolers 44 and 46 may be placed in air supply branches 30 and 32, respectively, to further increase the efficiency of the turbocharger system 2 by reducing the temperature of the compressed air prior to it being forwarded to the engine/compressor unit 4. As will be explained in more detail hereinbelow, the disclosed turbocharger system inherently tends to properly proportion the amount of compressed air supplied to the respective banks of cylinders but an additional flow regulating diverter valve 48 may be placed at the junction of air supply duct 34 and branch 38 to allow any desired division of the compressed air supplied to the respective cylinder banks.

In a working model of the above concept employing a Cummins V-903 converted engine/compressor unit combined with first and second turbochargers manufactured by Roto Master as described above with the engine/compressor operating at 2,250 revolutions per minute, ambient temperature of 94° F. and barometer reading of 29.30 inches, a total of 614 cubic feet per minute of free air output was achieved at a discharge pressure of 100 psig and temperature reading at points $P_1$–$P_{11}$ throughout the system illustrated in FIG. 1 being as listed in the following table.

TABLE 1

| | Temp. (°F.) | Pressure (in. Hg or psig) |
|---|---|---|
| $P_1$ | 104 | atm. |
| $P_2$ | 104 | atm. |
| $P_3$ | 235 | 18.5 in. |
| $P_4$ | 252 | 18.5 in. |
| $P_5$ | 130 | 17.8 in. |
| $P_6$ | 124 | 17.5 in. |
| $P_7$ | 145 | 17.4 in. |
| $P_8$ | 140 | 17.6 in. |
| $P_9$ | 1250 | 42 psig |
| $P_{10}$ | 1050 | 15 psig |
| $P_{11}$ | 900 | atm. |

Figure 2:
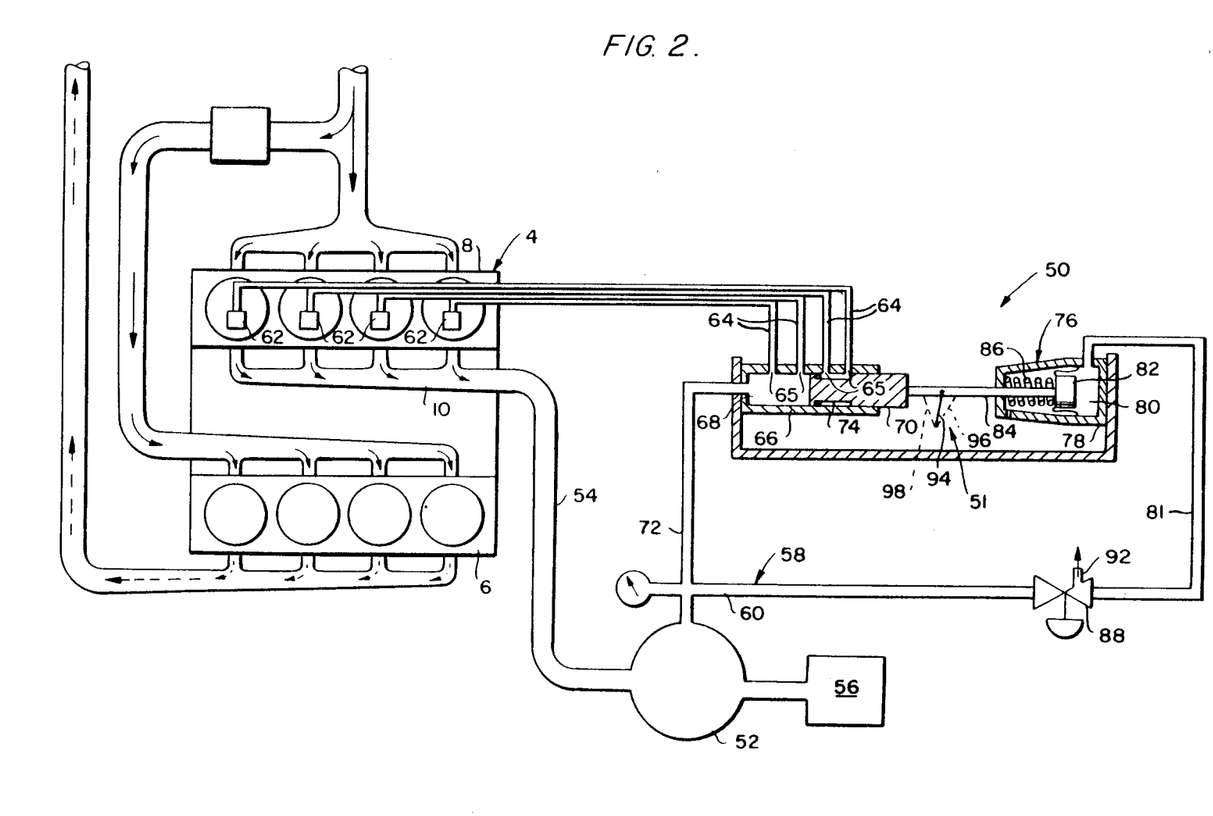
FIG. 2 is a partial diagrammatic illustration of the turbocharged engine/compressor unit of FIG. 1 modified to include a combined compressor cylinder control means and engine throttle means designed in accordance with the subject invention.

Referring now to FIG. 2, a modification of the turbocharged system of FIG. 1 is illustrated wherein a compressor cylinder control means 50 and throttle means 51 is illustrated in combination with a converted engine/compressor unit 4 of the type illustrated in FIG. 1. The compressor cylinder control means 50 and throttle means 51 operates to activate only the compressor cylinders necessary to maintain the required air flow and allows the engine to run at low speeds and light loads during partial air requirements. This construction insures increased economy and longer engine life and is described in greater detail in commonly assigned U.S. Pat. No. 4,232,997. This modified system provides the further advantage of facilitating the operation of the compound turbocharger system of FIG. 1 by automatically adjusting compressor speed to the flow requirements of the compressed air utilizing device, thereby keeping the turbocharger from a damaging surge condition when compressed air usage is reduced drastically. The control system also serves as an aneroid device reducing smoke emissions during acceleration.

Referring more specifically to FIG. 2, a compressed air storage tank 52 is shown connected with compressed air manifold 10 by air pipe 54. A compressed air utilizing means or device 56 may be any one or a plurality of well known devices such as an air hammer, pneumatic construction equipment, or a similar device. Normally, devices of this type will utilize air at a variable rate completely independent of the operation of the engine/compressor unit 4. In order to properly pace the operation of the engine/compressor unit, the compressor cylinder control means 50 and throttle means 51 responds to sensor means 58 consisting of merely a conduit 60 connected with storage tank 52 in order to generate a pneumatic signal representative of changes in the pressure of air within tank 52. Accordingly, the pressure in conduit 60 will represent the degree to which the engine/compressor unit 4 is moving ahead or falling behind the rate of compressed air consumption by utilizing device 56.

Compressor cylinder control means 50 responds to the signal supplied by conduit 60 to activate or deactivate in series, one at a time, the cylinders in compressor bank 8 by supplying a pneumatic control signal to a plurality of cylinder activating devices 62 connected, respectively, to each of the cylinders in bank 8. The operation of cylinder activating devices 62 is described in greater detail in commonly assigned U.S. Pat. No. 3,462,074. The pneumatic signal for each of the devices 62 is supplied through a corresponding one of a plurality of activating conduits 64 opening at spaced locations 65 along valve housing 66. The interior of valve housing 66 includes a chamber 68 communicating with conduits 64 though openings 65 and further receives a plunger 70 movable axially within chamber 68 to seal openings 65 from the interior of the chamber 68. Air under pressure is supplied to chamber 68 by conduit 72 which is connected with conduit 60 to receive compressed air from storage tank 52. When plunger 70 is moved to allow communication between chamber 68 and a conduit 64 through a corresponding opening 65, air under pressure is supplied to a corresponding one of the activating devices 62. As further set forth in U.S. Pat. No. 3,462,074, devices 62 respond to air pressure above a predetermined level to deactivate or unload the corresponding compressor cylinder. As plunger 70 is moved axially to the left as shown in FIG. 2, an annular recess 74 operates to release air pressure supplied to a corresponding activating device 62 and thereby activates or loads the corresponding compressor cylinder. It can now be appreciated that as the plunger 70 moves fully to its left hand position, all of the compressor cylinders will be activated, and, conversely, when plunger 70 is displaced to its right closed position, all of the compressor cylinders will be deactivated whenever the pressure in storage tank 52 reaches a level sufficient to deactivate devices 62.

Plunger 70 is moved between its leftmost and rightmost positions by operator means 76 including an operator housing 78 containing an interior chamber within which a diaphragm type piston 82 is mounted to respond to pressure supplied to one end of chamber 80 through conduit 81. Piston 82 is connected to plunger 70 by means of an operator linkage 84. Normally piston 82 is biased to the right by means of compression spring 86 but is moved to the left when chamber 80 is pressurized sufficiently to overcome the force of spring 86 and the force of gas pressure in chamber 68 on plunger 70. Air pressure is supplied to chamber 80 by means of a pressure responsive valve 88 set to open at a predetermined pressure in conduit 60 to allow air to flow from conduit 60 into chamber 80 by means of conduit 81. Once the pressure in storage tank 52 exceeds the predetermined pressure level established by valve 88, air is allowed to flow into chamber 80 to move plunger 70 towards its leftmost position to successively deactivate, one at a time, the compressor cylinders of bank 8. Whenever the pressure in storage tank 52 falls below the predetermined pressure level by a preselected amount, valve 88 will close and chamber 80 will be evacuated through bleed port 92 to cause spring 86 and the pressure in chamber 68 to move plunger 70 to its rightmost position.

FIG. 2 further illustrates engine throttle means 51 including a throttle lever 94 connected with operator linkage 84 for controlling engine speed and torque by controlling the rate at which fuel is fed to the engine cylinders in bank 6. Dashed lines 96 illustrate the rightmost position of throttle lever 94 which corresponds to low rpm engine/compressor operation. Dashed lines 98 disclose the leftmost position of engine throttle lever 94 corresponding to maximum engine/compressor unit rpm. Accordingly, it can be seen that cylinder control means 50 and throttle means 51 are capable of simultaneously controlling engine/compressor speed and at the same time activating or deactivating a proportional number of compressor cylinders. Thus, at low rpm, all compressor cylinders 8 would be activated whereas at high rpm only a single or no compressor cylinder would be activated. In addition to promoting engine/compressor efficiency and reducing engine wear and fuel consumption, the cylinder control means 50 and throttle means 51 of FIG. 2 will operate to insure the smooth operation of the compound turbocharger system 2 of FIG. 1. In particular, means 50 and 51 causes the engine cylinders to generate exhaust gases in an amount roughly equal to that required to drive the compressors at a rate which is necessary to supply the amount of compressed air required by the compressor cylinder 8 in order to meet the demands of the utilizing devices.

Figure 3:
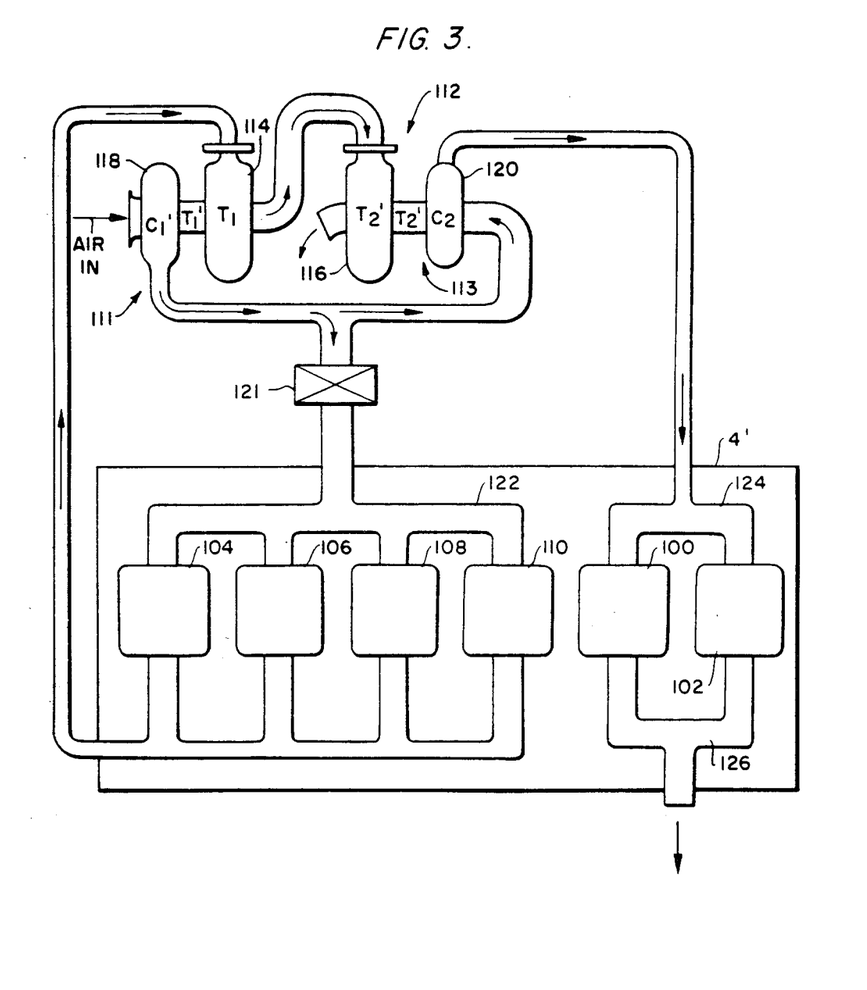
FIG. 3 is a schematic illustration of an alternative embodiment of a compound turbocharger system used to supply air under pressure to both the engine cylinders and compressor cylinders of an engine/compressor unit.

Reference is now made to FIG. 3 in which an alternative embodiment of the subject invention is disclosed including an engine/compressor unit 4' formed by converting an in-line 6 cylinder internal combustion engine such as a compression ignition engine manufactured by the Cummins Engine Company, Inc. under the designation 855. Unlike the embodiment of FIGS. 1 and 2, the engine/compressor unit 4' of FIG. 3 involves the conversion of only two cylinders 100 and 102 to operate as compressor cylinders while leaving the remaining four cylinders 104, 106, 108 and 110 to operate in the normal manner. Since the arrangement of FIG. 3 will impose a slightly reduced requirement for air pressure boost in relationship to the amount of available exhaust gases in contrast to the arrangement of FIGS. 1 and 2, the compound turbocharger system 112 has been arranged in a manner slightly different from that illustrated in FIG. 1. In particular, the system includes two conventionally available turbochargers 111 and 113 in which the turbine components 114 and 116 are arranged in serial relationship like the system of FIG. 1, but the compressor components 118 and 120 are arranged differently. In particular, a portion of the output from compressor component 118 is supplied through a flow regulator 121 to the intake manifold 122 leading to the engine cylinders and the remaining portion of the output from compressor component 118 is supplied to the input of the compressor component 120 for further boost before being supplied to the air compressor cylinders 100, 102 through the compressor intake manifold 124. By this arrangement, the boost requirements of both the engine cylinders 104, 106, 108 and 110 and the compressor cylinders 100, 102 can be satisfied by the use of conventionally available turbocharger units. Moreover, the serial arrangement of compressor components 118 and 120 serves the purpose of providing even higher first stage air compression to the compressor cylinders 100, 102 and thus supplies even higher pressures to the output manifold 126 of the compressor cylinders 100, 102.

Figure 4:
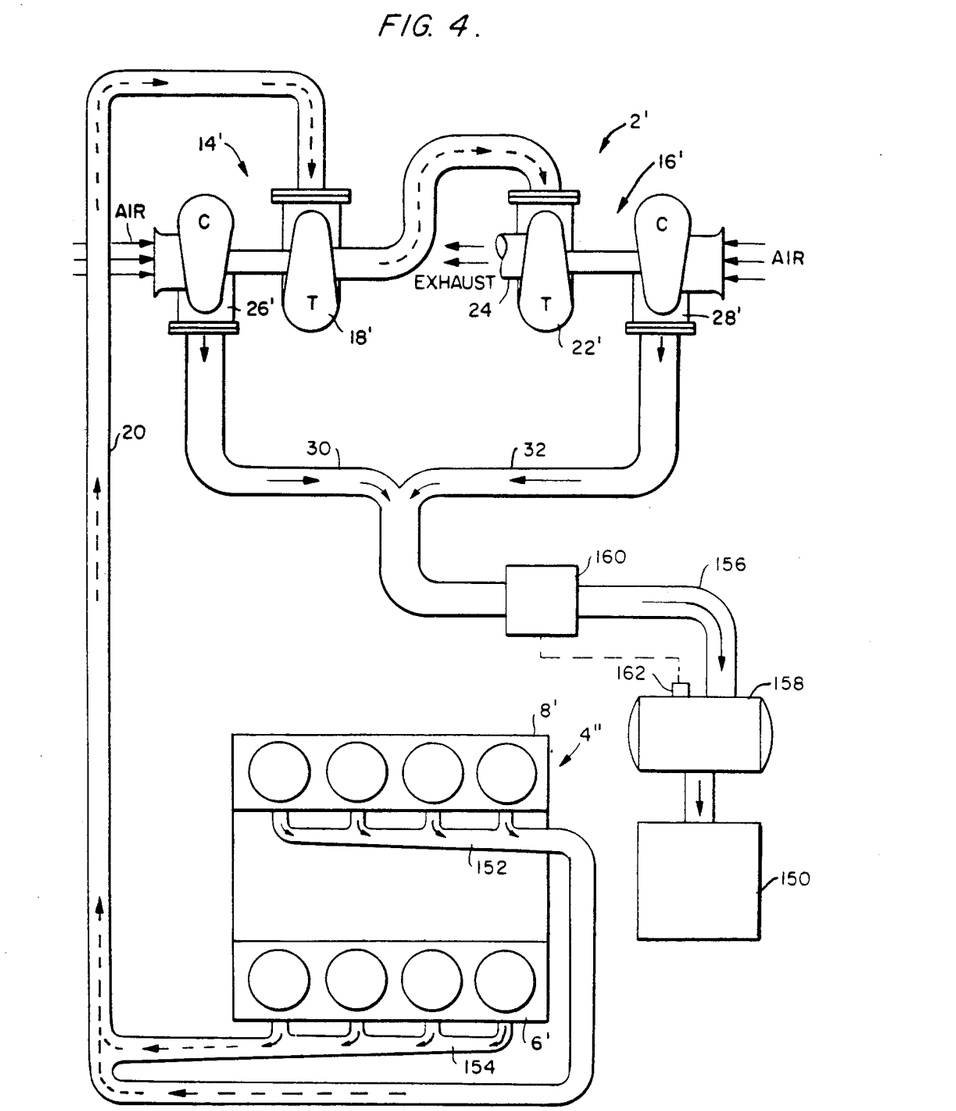
FIG. 4 is a schematic illustration of a compound turbocharger unit designed to supply an excess quantity of compressed air for use in a material conveying system.

In FIG. 4, yet another embodiment of the subject invention is disclosed wherein a compound turbocharger system 2' (similar to that of FIG. 1) is used to supply compressed gas to an auxiliary compressed air utilizing device or means such as an air pressure operated concrete conveyor 150 of the type illustrated in U.S. Pat. No. 3,667,865. In particular, the compound compressor system 2' is connected with a compression ignition engine 4'' including a pair of cylinder banks 6' and 8' in which all of the cylinders operate as engine cylinders. The exhaust gases from the engine cylinders are collected by exhaust manifolds 152 and 154 and are directed by conduit 20 to the compound turbocharger system 2' which is arranged in the same manner as the embodiment of FIG. 1. However, for a given total cylinder displacement, the total flow of exhaust gases from engine 4'' is approximately twice the mass flow from engine 4 of FIG. 1 since twice as many cylinders are supplying exhaust gases to the compound turbocharger system. Thus, it is possible to select larger capacity turbines (18' and 22') and compressors (26' and 28') as compared with the corresponding units of FIG. 1. The additional amount of compressed air produced by the enlarged, parallel connected compressors 26' and 28' may be diverted through conduit 156 for storage in compressed air storage tank 158. As requested, the compressed air in tank 158 may be used to operate an auxiliary compressed air utilizing device such as, for example, a concrete slurry pump as described in U.S. Pat. No. 3,667,865. Devices of this type will often use a substantial amount of compressed air. An arrangement such as illustrated in FIG. 4 should produce sufficient compressed air for off-loading functions even though the engine is operating at idle speeds. An automatically operated valve 160, sensitive to pressure within tank 158 as determined by sensor 162, may be used to control the amount of compressed air entering tank 158.

The embodiment of FIG. 4 is ideally suited for application to concrete hauling vehicles wherein engine 4'' would be the vehicle engine and concrete conveyor 150 would be used to off load concrete at the construction site to which concrete is delivered. The system of FIG.

4 would thus eliminate the necessity for a separate prime mover or expensive mechanical power take off connection between the vehicle engine and the concrete pump. Of course, the system of FIG. 4 could be used in any environment wherein compressed air is required in conjunction with the operation of an internal combustion engine, such as a conveyor system for transferring ground materials in a column of air. Since the turbine/compressor components are of the type which are readily available, the system of FIG. 4 provides an extremely cost effective substitute for the conventional auxiliary air compressor system used on vehicles wherein a compressor is mechanically driven by the vehicle engine or by an auxiliary prime mover.

Still other applications of the subject invention are possible including systems in which the engine/compressor unit employs an engine block which is entirely separate from the compressor block. For example, an engine/compressor unit may be formed from an unmodified Cummins V-903 Diesel engine (having 8 engine cylinders) arranged to drive a compressor formed from a separate converted V-903 block (having 8 compressor cylinders) with three cylinders in each bank operating in parallel to supply compressed air to a final compressor cylinder stage. Without a turbocharger arrangement, this engine/compressor unit would be capable of supplying approximately 600 CFM at 250 psi. However, a compound turbocharger arrangement of three turbocharger units could be employed wherein all of the exhaust gases from the engine would be passed into the turbine of the first turbocharger unit and subsequently passed in parallel through the turbines of the remaining two turbocharger units. All of the compressors would operate in parallel to supply compressed air through an intercooler to both the 903 engine and the converted 903 compressor. By this arrangement, 900 cfm of air at 350 psi could be produced.

INDUSTRIAL APPLICABILITY

The disclosed compound turbocharger system finds particular applicability to engine compressor units which have been converted from conventional internal combustion engines of the compression ignition type to form separate engine cylinders and compressor cylinders within the same block. Engine/compressor units of this type are widely used for construction, oil drilling and other industrial applications requiring substantial quantities of compressed air. By means of the disclosed compound turbocharger system, both the efficiency of the engine cylinders and the mass flow and output pressure of the compressor cylinders can be increased for a given unit weight. For example, a conventional portable air compressor capable of producing 600 cfm normally requires a two axle four wheel trailer support and can only be transported by a large flat bed or "low boy" tractor trailer equipment. By employing the subject invention, the bulk and weight of a 600 cfm compressor can be reduced sufficiently to allow the compressor to be mounted on a single axle/2 wheel trailer which may be towed from site to site by a conventional pick up truck. Moreover, the disclosed compound turbocharger system of the subject invention may be employed wherever it is desired to supply the compressed air required for a compressed air utilizing device by use of the energy contained in the exhaust gases from an internal combustion engine.

I claim:

1. A compound turbocharger system, comprising
   (a) an internal combustion engine containing at least one engine cylinder and an intake manifold for supplying air to said engine cylinder;
   (b) a compressed air utilizing means for consuming a substantial amount of compressed air as compared with the amount of air supplied by said intake manifold to said internal combustion engine during the operation; and
   (c) compressed air generating means connected with said compressed air utilizing means for producing compressed air in sufficient quantities to satisfy the requirements of said compressed air utilizing device and said engine when both said internal combustion engine and said compressed air utilizing device are operated simultaneously, said compressed air generating means including
      (1) first turbocharger means to turbocharge said internal combustion engine by receiving exhaust gas from said at least one engine cylinder and by supplying air under pressure to said intake manifold, said first turbocharger means including a first turbine connected to receive exhaust gases directly from said engine cylinder and a first impeller-type compressor mechanically driven by said first turbine for compressing air received from the atmosphere and supplying the compressed air to said compressed air to said compressed air utilizing means,
      (2) second turbocharger means to turbocharge said internal combustion engine by supplying air under pressure to said intake manifold, said second turbocharger means including a second turbine fluidically connected to receive exhaust gases in series from said first turbine and a second impeller-type compressor mechanically driven by said second turbine for operating in combination with said first compressor by compressing air received from the atmosphere and supplying the compressed air in combination with said first impeller-type compressor to said compressed air utilizing means.

2. A compound turbocharger system as defined in claim 1, wherein said first and second impeller-type compressors are fluidically connected in parallel for receiving air from the atosphere and for providing air under pressure in parallel to said compressed air utilizing means.

3. A combined engine/compressor unit, comprising:
   (a) an internal combustion engine containing plural engine cylinders;
   (b) plural pistons mounted for reciprocable motion within said cylinders, respectively;
   (c) first turbocharger means including a first turbine connected to receive exhaust gases directly from said engine cylinders and a first impeller-type compressor mechanically driven by said first turbine for compressing air received from the atmosphere, said first impeller-type compressor supplying compressed air to said engine cylinders,
   (d) second turbocharger means including a second turbine fluidically connected to receive exhaust gases in series from said first turbine and a second impeller-type compressor mechanically driven by said second turbine for operating in combination with said first compressor by compressing air received from the atmosphere and supplying compressed air in combination with said first impeller-type compressor; and (e) an air compressor, said second impeller-type compressor supplying air to said air compressor, said first and second impeller-type compressors being fluidically connected in parallel for receiving air from the atmosphere and for providing air under pressure in parallel to both the engine and compressor.

4. A method for forming a turbocharged engine/compressor unit from a conventional internal combustion engine/compressor unit, comprising the steps of providing a pair of turbocharger units each of which includes a compressor and a mechanically connected, exhaust driven turbine and arranging said turbocharger units for supplying air to both the engine and to the compressor of the engine/compressor unit to increase engine cylinder output torque and to increase the volume of compressed air supplied to an air outlet by the compressor of the engine/compressor unit, said step of arranging the turbocharger units for supplying air including the substeps of:

(1) providing means for connecting the exhaust turbines fluidically in series to receive exhaust gases in series solely from the engine, and (2) providing means for connecting the turbocharger compressors fluidically in parallel for receiving air from the atmosphere and for providing air under pressure in parallel to both the engine and compressor of the engine/compressor unit.

5. A method as defined in claim 4, wherein said step of providing a pair of turbocharger units includes the step of selecting a pair of turbocharger units wherein the compressor of each unit is insufficient to provide more than the mass flow of air required to turbocharge the engine of the engine/compressor unit.

* * * * *